United States Patent Office 3,580,877
Patented May 25, 1971

3,580,877
EMULSION POLYMERS OF STYRENE AND
UNSATURATED AMIDES
Alfred Reginald Corry, Dorthy Joyce Guest, and William
Ian Williamson, Manchester, England, assignors to Imperial Chemical Industries Limited, London, England
No Drawing. Filed May 18, 1967, Ser. No. 639,302
Claims priority, application Great Britain, May 25, 1966,
23,406/66
Int. Cl. B01j 13/00; C08f 15/02; C09d 5/02
U.S. Cl. 260—29.6RW                                16 Claims

ABSTRACT OF THE DISCLOSURE

Aqueous dispersions of water- and alkali-insoluble solid copolymers of a major proportion by weight of (a) styrene or of a substituted styrene or of mixtures of these, with a minor proportion by weight of (b) a neutral or acidic water-soluble monomer, and optionally with a minor proportion by weight of (c) a different neutral or acidic water-soluble monomer wherein monomer (b) is concentrated at or near the surface of the particles of the copolymer. The dispersions are useful for addition to liquid synthetic detergents to give them the appearance and creamy consistency of a hand lotion.

This invention relates to aqueous copolymer dispersions having new and valuable properties and more particularly to water- and alkaline-insoluble copolymers of styrene with a monomer or a mixture of monomers which are copolymerisable therewith.

Thus according to the present invention there are provided aqueous dispersions of water- and alkali-insoluble solid copolymers of a major proportion by weight of (a) styrene or of a substituted styrene or of mixtures of these, with a minor proportion by weight of (b) a neutral or acidic water-soluble monomer, and optionally with a minor proportion by weight of (c) a different neutral or acidic water-soluble monomer wherein monomer (b) is concentrated at or near the surface of the particles of the copolymer.

As examples of substituted styrenes which may be used in the present inveniton there may be mentioned for example, vinyl toluene, ethyl, ethoxy, methoxy, chloro or bromo substituted styrenes or any other of those ring substituted styrenes which may be polymerised or copolymerised in aqueous emulsion by means of free-radical catalysts.

As examples of neutral or acidic water-soluble monomers represented by (b), a minor proportion by weight of which may be copolymerised with a major proportion by weight of styrene or of a substituted styrene as defined above, there may be mentioned hydroxypropylacrylate, hydroxypropyl methacrylate, hydroxyethyl acrylate and methacrylate, methacrylic and acrylic acids, acrylonitrile, acrylamide, methacrylamide, hydroxyethyl acrylamide, maleic acid and water-soluble derivatives of maleic acid.

As examples of the neutral or acidic water-soluble monomers represetnted by (c), a minor proportion by weight of which may optionally be copolymerised with a major proportion by weight of styrene or of a substituted styrene and a minor proportion by weight of monomer (b) as defined above, there may be mentioned acrylamide, methacrylamide and the other water-soluble monomers listed above.

The composition of the water- and alkali-insoluble copolymer of (a) styrene or of a substituted styrene with (b) a neutral or acidic water-soluble monomer and with (c) a different neutral or acidic water-soluble monomer may vary within wide limits, but it is preferred that the copolymer should contain from 50% to 95% by weight of styrene or of a substituted styrene, 50% to 5% by weight of the water-soluble monomer (b) and 0% to 30% by weight of the monomer (c).

The aqueous dispersions of solid copolymers as defined above are obtained by modifications of methods known in themselves, for example by modifications of conventional emulsion polymerisation techniques. The addition of monomers (a), (b) and (c) to the polymerisation reaction is so regulated that in the resultant aqueous dispersion of copolymer articles, monomer (b) is concentrated at or near the surface of the particles. The polymisation is therefore so conducted that the proportion of monomer (b) relative to the proportion of mnomers (a) and (c) taken together is increased as the polymerisation proceeds.

Thus according to a further feature of the invention there is provided a process for the manufacture of aqueous dispersions of water- and alkali-insoluble solid copolymers as defined above wherein the polymerisation reaction is so conducted that the proportion of monomer (b) relative to the proportions of monomers (a) and (c) taken together is increased as the polymerisation proceeds.

The necessary reaction conditions may be achieved by adding monomer (b) to the polymerisation reaction mixture at a rate such that the proportion of monomer (b) relative to the proportion of monomers (a) and (c) taken together is increased as the polymerisation proceeds, and more particularly by withholding all or part of monomer (b) from the polymerisation reaction until a substantial proportion of monomers (a) and (c) has been polymerised, and then adding monomer (b) or such part thereof as has been withheld from the reaction together with the remainder of monomers (a) and (c).

It is preferred that more than 50% of the monomer (b) is withheld from the polymerisation reaction until at least 50% of the other constituent monomers (a) and (c) has been allowed to polymerise, and it is particularly preferred that from 75 to 100% of monomer (b) is so withheld.

The aqueous copolymer dispersions of the present invention are particularly valuable for opacifying liquid synthetic detergent compositions.

With the advent of the synthetic detergents it was natural that they should be considered for the preparation of detergent toilet compositions since amongst their advantages over soap they do not form insoluble scum deposits with hard water. However, the synthetic detergents when used alone for this purpose are inadequate in that they are generally deficient in foaming power and they may impart a somewhat unpleasant sensation when used in contact with the skin since they do not posses the unctuous properties of the soaps.

It is therefore desirable that synthetic detergent liquids used for toilet purposes should be of an unctuous nature. It is found that such liquids are particularly desirable when they have the appearance and give the sensation to the skin of a hand lotion, that is they are opaque and have a creamy consistency.

It has already been proposed to give to liquid synthetic detergents the appearance and creamy consistency of a hand lotion by incorporating into the detergent an aqueous dispersion of a polymer of styrene or of a substituted styrene or of certain copolymers thereof. However, it is often found that these copolymers do not give stable dispersions when incorporated into certain detergent compositions. It has now been found that these difficulties may be largely or completely overcome by employing copolymers of styrene having the composition and being made by the process hereinbefore described.

By a liquid synthetic detergent we mean any liquid nonionic, anionic or cationic detergent or compatible mixture of such detergents. As examples of non-ionic detergents there may be mentioned for example the condensates of ethylene oxide with the alkylphenols, the fatty alcohols, the fatty acids and the fatty acid mono and dialkanolamides. As examples of the anionic detergents there may be mentioned the alkyl benzene sulphontes, the sulphated alkylphenol/alkylene oxide condensates and sulphated primary and secondary fatty alcohols. As examples of the cationic detergents there may be mentioned the higher alkyl trimethylammonium halides, the higher alkyl pyridinium halides and the alkyl dimethyl arylammonium halides.

It is preferred that if the copolymers of the present invention contain anionic groups they should be incorporated into a liquid detergent having the same charge. If this latter precaution is not taken and a dispersion containing anionic groups is added to a cationic detergent then salt-like linkages may be formed and instability is possible. However a copolymer comprising a component having anionic groups may be added to an anionic or neutral detergent. Neutral dispersions may of course be added to any detergent.

There may also be present in the opaque detergent compositions any of the materials which are conventionally employed in the formulation of detergent composition. There may be mentioned for example the "builders" such as for example tetrasodium pyrophosphate, sodium, potassium, ammonium and alkanolamine hexametaphosphates and pentasodium tripolyphosphate, optical whitening agents colouring agents, foaming agents and soil suspending agents for example carboxymethyl cellulose, polyvinyl alcohol and polyvinyl-pyrrolidone.

The choice of compositions of the polymer for opacifying a particular detergent composition depends upon a number of factors, for example, the nature of the liquid synthetic detergent or mixture of detergents into which the copolymer is to be incorporated, the pH of the said detergent and the temperature at which the detergent composition is to be stored.

The composition of the copolymer may be critical for a particular detergent composition.

In some cases it may be found that the water-soluble monomer (b) can be omitted from the copolymer without affecting the stability of the product obtained when the copolymer is blended with a detergent composition. In other detergent compositions, the presence of the water-soluble monomer (b) is vital in order that a stable dispersion shall be maintained over long periods of time.

It has been found that if all the separate polymerisable components of the copolymer are merely mixed together and copolymerized under aqueous emulsion polymerisation conditions, then the resulting aqueous dispersion is frequently unstable when incorporated into a detergent composition. After a period time which may vary from a few hours to several days the copolymer coagulates and setles out and the detergent composition loses its opacity.

If, however, the polymerisation is carried out by the differential technique disclosed in the present invention, then aqueous emulsions are obtained which are stable for an indefinite period of time when incorporated into detergent compositions.

It is evident that the properties of the aqueous copolymer dispersions when incorporated into detergent compositions depend upon the manner in which the copolymer has been prepared. When the copolymer particles are of uniform composition throughout, the resulting dispersion is of little value when incorporated into certain detergent compositions because of its tendency to settle out rapidly, so that the detergent composition loses its opacity and unctuous properties.

When, however, the copolymer is prepared so that all or part of the monomer (b), as hereinbefore defined, is withheld from the polymerisation reaction until a substantial proportion of the other constituent monomers (a) and (c) as hereinbefore defined, has been allowed to polymerise, then dispersions of greatly improved stability, when incorporated into detergent compositions, are obtained. From the method of polymerisation disclosed, it is evident that monomer (b) is present preferentially on the surface of the polymer particles and that this factor is responsible for the icreased stability of the resultant copolymers compared with those in which the polymer particles are of uniform composition.

It has also been found that opacified detergent compositions which are stable indefinitely when stored under temperate conditions, may be unstable under tropical conditions. By a suitable choice of monomers within the scope of the present invention it has been found possible to prepare opacified detergent compositions which are stable indefinitely when stored at temperatures as high as 40° C.

It is known that the efficiency of an aqueous copolymer dispersion as an opacifier depends upon the size of the copolymer particles, and the relationship between particle size and the degree of opacification is discussed from a theoretical aspect in our earlier U.K. patent specification No. 985,503. In the case of the compositions of the present invention it is preferred that the diameters of the majority of the particles of the copolymer in the dispersion shall be greater than 0.1 micron and less than 4.0 microns.

The copolymer dispersion may be present in the detergent composition to any desired extent. However, below about 0.01% by weight of the total weight of the detergent composition there is little or no opacifying effect, and while quantities of the copolymer dispersion in excess of 5% by weight of the total weight of the detergent composition may be used without deleterious effects, there is little detectable increase in opacity above this level, so that use of larger quantities offers no advantage and may be uneconomic.

It is therefore preferred that the copolymer comprises from 0.01 to 5.0% by weight of the total weight of the detergent composition.

In certain cases, in order to improve the storage stability of the opaque liquid detergent composition, it is desirable to add to the aqueous dispersion of the copolymer minor amounts of a water-soluble polymer, for example, a water-soluble cellulose derivative such as a hydroxyethyl or carboxyethyl cellulose, a polyacrylic or methacrylic salt, a polyvinyl alcohol or a starch or starch derivative in aqueous solution.

The opaque detergent compositions may be prepared for example by adding the components of the formulation to water and agitating to obtain a homogeneous composition.

The invention is illustrated but not limited by the following examples in which the parts and percentages are by weight.

EXAMPLE 1

To a solution of 1.5 parts of sodium carbonate and 1.875 parts of Turkey red oil dissolved in 254 parts of water, maintained at 90° C., is added a mixture of 232 parts of styrene and 21.5 parts of hydroxypropyl acrylate over a 5 hour period in such a manner that 75% of the mixed monomers is added over the first 3 hours at a constant rate. A solution of 2.25 parts of ammonium persulphate in 36 parts of water is added concurrently with the monomer over the first 3 hours of the addition. After 3 hours, solutions of 21.5 parts of methacrylamide in 97.5 parts of water and 0.75 part of ammonium persulphate in 24 parts of water are added concurrently with the remaining 25% of the mixed monomers during the last two hours of the addition period.

The dispersion so obtained has good stability in all the detergent compositions tested and is thus much superior to the product described in Example 2 or 3, where the same monomers are used but the method of polymerisation does not conform to the procedure of the invention.

EXAMPLE 2

To a solution of 1.5 parts of sodium carbonate and 1.875 parts of Turkey red oil dissolved in 254 parts of water and maintained at 90° C., is added a mixture of 232 parts of styrene and 21.5 parts of hydroxypropyl acrylate at a constant rate over a 3 hour period. Concurrently, an addition of 2.25 parts of ammonium persulphate in 36 parts of water is made. At this point, that is when the addition of the mixed monomers is complete, simultaneous additions of 21.5 parts of methacrylamide dissolved in 97.5 parts of water and 1.5 parts of ammonium persulphate in 12 parts of water are made over a further 1 hour period.

This dispersion, unlike the product described in Example 1, has poor stability when mixed with detergents.

EXAMPLE 3

To a solution of 1.5 parts of sodium carbonate and 1.875 parts of Turkey red oil in 228 parts of water maintained at 90° C., is added the following over a 6 hour period at a constant rate:

(a) a mixture of 232 parts of styrene and 21.5 parts of hydroxypropyl acrylate.
(b) a solution of 21.5 parts of methacrylamide in 124 parts of water.
(c) a solution of 3 parts of ammonium persulphate in 72 parts of water.

The polymer dispersion so obtained, unlike the product described in Example 1, has poor stability when added to detergents.

EXAMPLE 4

To a solution of 1.5 parts of sodium carbonate and 1.875 parts of Turkey red oil in 254 parts of water, maintained at 90° C., is added a mixture of 232 parts of styrene and 21.5 parts of hydroxypropyl acrylate over a 5 hour period at a rate such that 50% of the monomer is added over the first 3 hours. A solution of 1.5 parts of ammonium persulphate in 36 parts of water is added concurrently with this monomer addition. At this point a solution of 21.5 parts of methacrylamide in 97.5 parts of water and a solution of 1.5 parts of ammonium persulphate in 24 parts of water are added to coincide with the addition of the remaining 50% of the monomers over the last two hours. The resulting polymer dispersion has good stability in all the detergent compositions tested.

EXAMPLE 5

Dispersion A. To a solution of 7.5 parts of sodium carbonate, 18 parts of a sulphonated long chain aliphatic ester, and 630 parts of water is added rapidly at 90° C. a solution of 6 parts of ammonium persulphate in 100 parts of water. There is then added to this aqueous solution a mixture of 1231.6 parts of styrene and 35.8 parts of acrylic acid at such a rate that 75% of this mixture is added during 3 hours, and the remaining 25% is added during the following 2 hours. During the first 3 hours addition of the mixed monomers there is added concurrently a solution of 5.25 parts of ammonium persulphate in 720 parts of water. During the final 2 hours of the 5 hour addition period there is added, together with the final 25% of the styrene/acrylic acid mixture, a solution of 107.5 parts of methacrylamide in 487.5 parts of water and a solution of 3.75 parts of ammonium persulphate in 120 parts of water. When all these additions are completed there is added a solution of 2.5 parts of ammonium persulphate in 30 parts of water. The temperature of the polymerising emulsion is held throughout at 90–92° C. The product is cooled and filtered to remove traces of coarse material.

The polymer dispersion so obtained may be contrasted, in its behaviour as a detergent opacifier, with a polymer dispersion (Dispersion B) made from the same monomers, used in the same amounts, where the method of polymerisation is to add the monomers to the aqueous phase concurrently instead of by the differential addition technique of the invention.

The following table exemplifies the advantages of the use of Dispersion A as compared with Dispersion B in opacification tests in two detergents, referred to as Detergent 1 and Detergent 2. 1% of each of the dispersions A and B is added to Detergent 1 and 2.

Detergent 1 is an anionic/non-ionic detergent mixture having the following composition:

|   | Parts |
|---|---|
| Alkyl phenol/ethylene oxide condensate | 12 |
| Sodium dodecylbenzene sulphonate | 5 |
| Sodium xylene sulphonate | 3 |
| Water | 80 |
|   | 100 |

Detergent 2 is a commercially available anionic detergent.

|   | Detergent 1 | | Detergent 2 | |
|---|---|---|---|---|
|   | Stability of mix during 16 hours at 40° C. | Optical density of mix | Stability of mix during 16 hours at 40° C. | Optical density of mix |
| Polymer dispersion A | Very good [1] | 0.098 | Very good [1] | 0.108 |
| Polymer dispersion B | Poor [2] | 0.040 | Poor [3] | 0.096 |

[1] No solid separates.
[2] Solid separates in the form of "bits" at bottom of liquid.
[3] Brownish layer at bottom of liquid.

The optical densities were measured on an SP.600 photometer using a 1 cm. cell using water as reference liquid and illumination of wavelength 470 m$\mu$. Measurements were carried out on solutions obtained by diluting 2.5 g. of mixture to 500 ml.

What we claim is:

1. Aqueous dispersions of water- and alkali-insoluble solid copolymers consisting essentially of at least 50% by weight of (a) units of styrene or of a substituted styrene or of mixtures of these, with at most 50% by weight of (b) units of a monomer selected from the group consisting of acrylamide and methacrylamide, wherein the concentration of monomer (b) in said copolymer is greater at or near the surfaces of the particles of the copolymer.

2. Aqueous dispersions as set forth in claim 1 wherein the copolymers also contain a minor proportion by weight of (c) a different neutral or acidic water-soluble monomer.

3. Aqueous copolymer dispersions as claimed in claim 2 wherein monomer (c) is hydroxypropylacrylate or acrylic acid.

4. Aqueous copolymer dispersions as claimed in claim 1 wherein monomer (b) is methacrylamide.

5. Aqueous copolymer dispersions as claimed in claim 2 wherein the polymer contains from 50% to 95% by weight of monomer (a), from 50% to 5% by weight of monomer (b) and from 0% to 30% by weight of monomer (c).

6. A process for the manufacture of aqueous dispersions of water- and alkali-insoluble solid copolymers consisting essentially of at least 50% by weight of (a) units of styrene or of a substituted styrene or of mixtures of these, with at most 50% by weight of (b) units of a monomer selected from the group consisting of acrylamide and methacrylamide, wherein the concentration of monomer (b) in said copolymer is greater at or near the surfaces of the particles of the copolymer and wherein the copolymers also contain a minor proportion by weight of (c) a different neutral or acidic water-soluble monomer wherein the polymerization reaction is so conducted that the proportion of monomer (b) relative to the proportions of monomers (a) and (c) taken together is increased as the polymerization proceeds.

7. A process as claimed in claim 6 wherein monomer (b) is added to the polymerisation reaction mixture at a rate such that the proportion of monomer (b) relative to the proportion of monomers (a) and (c) taken together is increased as the polymerisation proceeds.

8. A process as claimed in claim 6 wherein all or part of monomer (b) is withheld from the polymerisation reaction until a substantial proportion of monomers (a) and (c) has been polymerised, and then adding monomer (b) or such part thereof as has been withheld from the reaction together with the remainder of monomers (a) and (c).

9. A process as claimed in claim 6 wherein more than 50% of monomer (b) is withheld from the polymerization reaction until at least 50% of the other constituent monomers (a) and (c) has been allowed to polymerize.

10. A process as claimed in claim 6 wherein 75% to 100% of monomer (b) is withheld from the polymerization reaction until at least 50% of the other constituent monomers (a) and (c) has been allowed to polymerize.

11. An opaque liquid detergent composition which comprises a liquid synthetic detergent or a mixture of synthetic detergents and an aqueous polymer dispersion as claimed in claim 1.

12. A composition as claimed in claim 11 wherein the aqueous polymer dispersion is an aqueous dispersion of a copolymer of styrene, hydroxypropyl acrylate and methacrylamide.

13. A composition as claimed in claim 11 wherein the aqueous polymer dispersion is an aqueous dispersion of a copolymer of styrene, acrylic acid and methacrylamide.

14. A composition as claimed in claim 11 wherein the majority of particles of copolymer in the aqueous dispersion have diameters greater than 0.1 micron and less than 4.0 microns.

15. A composition as claimed in claim 11 wherein the copolymer comprises from 0.01% to 5.0% by weight of the total weight of the detergent composition.

16. A composition as claimed in claim 11 which contains a minor amount of a water-soluble polymer to improve the storage stability.

References Cited

UNITED STATES PATENTS

| | | | |
|---|---|---|---|
| 3,329,638 | 7/1967 | Blyth | 260—886 |
| 3,401,134 | 9/1968 | Fantl et al. | 260—29.6RW |

MURRAY TILLMAN, Primary Examiner

W. J. BRIGGS, SR., Assistant Examiner

U.S. Cl. X.R.

160—312; 252—310, 311, 312R; 260—29.6TA, 80.73, 886